US008661440B2

(12) United States Patent  (10) Patent No.: US 8,661,440 B2
Cho  (45) Date of Patent: Feb. 25, 2014

(54) METHOD AND APPARATUS FOR PERFORMING RELATED TASKS ON MULTI-CORE PROCESSOR

(75) Inventor: Seung-mo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1510 days.

(21) Appl. No.: 11/967,633

(22) Filed: Dec. 31, 2007

(65) Prior Publication Data

US 2009/0007117 A1   Jan. 1, 2009

(30) Foreign Application Priority Data

Jun. 26, 2007   (KR) ........................ 10-2007-0063135

(51) Int. Cl.
G06F 9/46   (2006.01)
(52) U.S. Cl.
USPC ............ 718/100; 718/102; 718/104; 718/105
(58) Field of Classification Search
USPC .......................... 711/202, 203, 206; 718/100
See application file for complete search history.

(56) References Cited

U.S. PATENT DOCUMENTS

| | | | | |
|---|---|---|---|---|
| 6,665,708 | B1 * | 12/2003 | Tikekar et al. | 709/215 |
| 7,577,822 | B2 * | 8/2009 | Vorbach | 712/34 |
| 7,685,354 | B1 * | 3/2010 | Hetherington et al. | 711/5 |
| 2003/0028747 | A1 * | 2/2003 | Denneau et al. | 711/206 |
| 2003/0105939 | A1 * | 6/2003 | Cooksey et al. | 711/203 |
| 2006/0020946 | A1 * | 1/2006 | Alexander et al. | 719/315 |
| 2006/0041733 | A1 * | 2/2006 | Hyser | 711/203 |
| 2006/0212643 | A1 * | 9/2006 | Suzuoki | 711/5 |
| 2007/0288726 | A1 * | 12/2007 | Luick | 712/225 |

FOREIGN PATENT DOCUMENTS

| | | |
|---|---|---|
| JP | 6-230985 A | 8/1994 |
| JP | 09185540 A | 7/1997 |
| JP | 2000-330807 A | 11/2000 |
| JP | 2004220581 A | 8/2004 |
| KR | 1993-0010717 B1 | 6/1993 |
| KR | 1020030084553 A | 11/2003 |
| KR | 10-2004-0074622 A | 8/2004 |

OTHER PUBLICATIONS

Jette, "Expanding Symmetric Multiprocessor Capability Through Gang Scheduling," International Parallel Processing Symposium, Job Scheduling Strategies Workshop, Mar. 30, 1998, Lawrence Livermore National Laboratory, Livermore, USA.
Maeda et al., "A CELL Software Platform for Digital Media Application," COOL Chips VIII, Toshiba, Apr. 22, 2005, pp. 463-464, Yokohama, Japan.
Communication dated Jul. 25, 2013 issued by the Korean Intellectual Property Office in counterpart Application No. 10-2007-0063135.

* cited by examiner

*Primary Examiner* — Emerson Puente
*Assistant Examiner* — Charles Swift
(74) *Attorney, Agent, or Firm* — Sughrue Mion, PLLC

(57) ABSTRACT

A method and apparatus for performing related tasks in a multi-core processor are provided. The method of performing at least one related task on the multi-core processor including a plurality of cores, includes: determining whether data and address information which are required for performing the at least one related task are loaded in the cores of the multi-core processor; and controlling the multi-core processor based on a result of the determining so that the cores concurrently start to perform the at least one related task.

9 Claims, 7 Drawing Sheets

METHOD AND APPARATUS FOR PERFORMING RELATED TASKS ON MULTI-CORE PROCESSOR

CROSS-REFERENCE TO RELATED PATENT APPLICATION

This application claims priority from Korean Patent Application No. 10-2007-0063135, filed on Jun. 26, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to performing tasks, and more particularly, to performing related tasks in an asymmetric multi-core processor.

2. Description of the Related Art

Presently, demands for multimedia have drastically increased. Accordingly, it has become increasingly important to process a multimedia codec in addition to a video codec in real time. However, since many operations are needed to process the multimedia codec, it is necessary to improve the performance of a processor.

In the past, it was important to improve the performance of a processor by increasing the clock speed of a central processing unit (CPU). However, such increase in the clock speed of the CPU is limited. Accordingly, a next generation processor model is required. As such, one of the next generation processors has a multi-core structure in which a plurality of processor cores are embedded into a single chip so as to improve the performance of the processor.

Specifically, an asymmetric multi-core structure indicates a processor constructed with general purpose processor (GPP) cores for performing general processing operations and digital signal processor (DSP) cores for performing operations. Since the part corresponding to the DSP cores has a simpler structure than the GPP cores in terms of performance, degree of integration, and power, it is possible for a single chip to include a plurality of DSP cores.

Accordingly, a structure that is constructed with a GPP core and a plurality of DSP cores is generally preferred. Presently, each DSP core includes a separate local memory that needs to communicate with a main memory in order to share data, and the communication between the local memory and the main memory is performed by a direct memory access (DMA).

In general, the tasks that are performed by a DSP may be complicated operations rather than control operations. For example, the tasks may be codecs for multimedia processing or three-dimensional stereo-scopic image processing. In this case, the tasks may be performed, not in a single DSP core, however in a plurality of DSP cores due to memory requirements or operation requirements.

For example, in the case of an H.264 decoder, two DSPs are used to process a frame. Upper and lower parts of a screen are compressed by different DSPs. In this case, tasks that are to be performed by DSPs may have to closely communicate with one another. Accordingly, it is effective that the tasks be concurrently performed.

FIG. 1 illustrates an example in which related tasks arbitrarily start to be performed in a distributed system having a plurality of processing nodes according to a related art technique.

In FIG. 1, the number of related tasks is eight, and eight DSPs 111 to 118 perform the related tasks. The eight DSPs 111 to 118 begin the related tasks at any time, process the same amount of tasks, and perform the next operations of the tasks through synchronization.

In this case, an interval 140 is an instance during which the DSPs 111 to 118 stop their operations, thereby indicating that an overhead has occurred. For example, since the DSP 111, shown at the top of FIG. 1, begins tasks earlier than the other DSPs 112 to 118, the termination time of the tasks of the DSP 111 is earlier than those of the other DSPs 112 to 118. In order to begin the task of the DSP 111 again at a first time point 132, so as to synchronize the task of the DSP 111 with the tasks of the other DSPs 112 to 118, the task of the DSP 111 has to be delayed until the DSPs 112 to 118 finish their tasks. Accordingly, a section 141 occurs during which an operation is stopped so that the related tasks are all synchronized with each other.

Accordingly, in the case of a symmetric multi-processor system such as a general cluster or distributed system, when related tasks are not synchronized with one another, an overhead occurs. However, in such a symmetric distributed system, a plurality of processors are not on the same chip. Since the processors communicate with one another through a shared memory, there is no problem except for the occurrence of some overhead.

FIG. 2 illustrates an example of performing related tasks in an asymmetric multi-core processor according to a related art technique.

The asymmetric multi-core processor according to the related art technique includes a power processor element (PPE) 210, an operating system (OS) 220, and a synergistic processor element (SPE) 240.

The PPE 210 indicates a main processor corresponding to a GPP of the present invention, and the PPE 210 serves to drive the OS 220 and to control a system.

The OS 220 serves to communicate with an application program 230 under a control of the PPE 210 or serves to make a schedule for the SPE 240 that is to be described as follows.

The OS 220 drives various device drivers or software 222 and communicates information with the application program 230 through modules 232 and 234. In addition, the OS 220 may directly communicate information with the application program 230 through an API.

The OS 220 controls the SPE 240 through a scheduler 224.

The SPE 240 corresponds to a DSP of the present invention and mainly serves to perform operations, and the SPE 240 receives information from the OS 220 through SPE modules 261 to 264. Also, the SPE 240 performs tasks by using SPE threads 251 to 254 which are received under a control of the OS 220, and the SPE threads 251 to 254 correspond to a DSP context of the present invention.

Referring to FIG. 2, the PPE 210 secures that there are enough SPEs from among the SPE1 241 to SPE7 247 to perform the tasks and allows the SPE1 241 to SPE7 247 to perform the tasks through the scheduler 224 of the operating system 220. In this case, since SPE1 241 to SPE7 247 are on a single core, the tasks are concurrently performed within a predetermined range. Although the SPE1 241 to SPE7 247 exist on the same chip, since the scheduler 224 performs tasks by apportioning the SPE threads 251 to 254 respectively to SPE1 241 to SPE7 247, the particular SPE 240, among the SPE1 241 to SPE7 247, which first receives the SPE threads 251 to 254, first begins to perform the task.

Accordingly, the SPE 240 among the SPEs 241 to 247, which first begins to perform the task, is established.

For example, although tasks A and B have to be concurrently performed as related tasks, it is assumed that data needed for the task A is first loaded in the SPE1 241, and then, the task B is subsequently loaded in the SPE2 242. At this time, when the SPE1 241 transmits data or signals to the SPE2 242 when the task B is not yet loaded in the SPE2 242, since the SPE2 242 does not have corresponding data, the SPE2 242 has to access the main memory.

In this case, since the data or signals have to be transmitted from the chip to the main memory, efficiency is reduced. In addition, when data needed for the task B is loaded in the SPE2 242 and executed late, since information needed for allowing the SPE1 241 to communicate with the SPE2 242 at the time when the task B is performed has to be updated, there is a problem in that the task A is stopped for a long time.

Since the SPEs 241 to 247 are on the same chip in the asymmetric multi-core processor, and it is possible to perform communication among the SPEs 241 to 247 by directly accessing a local memory without passing through a shared memory, like a main memory, the communication speed is high. However, as described above, when the starting times of the related tasks are not at the same time with one another, since the overhead occurs, and the SPEs 241 to 247 have to communicate with one another through the shared memory, the performance of the processor deteriorates.

SUMMARY OF EXEMPLARY EMBODIMENTS OF THE INVENTION

Exemplary embodiments of the present invention provide a method and apparatus for performing tasks capable of improving the performance of a processor by controlling the processor so that related tasks start so as to be concurrently performed.

According to an aspect of the present invention, there is provided a method of performing at least one related task on a multi-core processor including a plurality of cores, the method comprising: determining whether data and address information which are required for performing the at least one related task are loaded in the cores of the multi-core processor; and controlling the multi-core processor based on the determination result so that the cores concurrently start to perform the at least one related task.

The address information may be mapping information between an effect address (EA) for indicating an indirect address of a storage space in the multi-core processor and a real address (RA) for indicating a real address of the storage space which corresponds to the EA.

The method of performing at least one related task on a multi-core processor including a plurality of cores may further comprise controlling the multi-core processor so that the mapping information is not changed while performing the at least one related task.

The data and the address information which are required to perform the related tasks may be loaded in at least one of memories and registers in the multi-core processor.

According to another aspect of the present invention, there is provided a method of performing at least one related task on a multi-core processor including a plurality of cores, the method comprising: generating an application program interface (API) including information needed for performing the at least one related task; and performing the at least one related tasks based on the generated API.

The API may include the number of related tasks that are to be performed through the API and address information needed for performing the related tasks.

The address information may represent EAs for indicating indirect addresses of storage spaces of the cores in which the related tasks are performed.

According to another aspect of the present invention, there is provided an apparatus for performing at least one related task on a multi-core processor including a plurality of cores, the apparatus comprising: a determiner determining whether data and address information which are required for performing the at least one related task are loaded in the cores of the multi-core processor; and a controller controlling the multi-core processor based on the determination result so that the cores concurrently start to perform the at least one related task.

According to another aspect of the present invention, there is provided an apparatus for performing at least one related task on a multi-core processor including a plurality of cores, the apparatus comprising: an API (application program interface) generating an API (application program interface) including information needed for performing the at least one related task; and a task executor performing the at least one related tasks based on the generated API.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the attached drawings.

Figure 1:
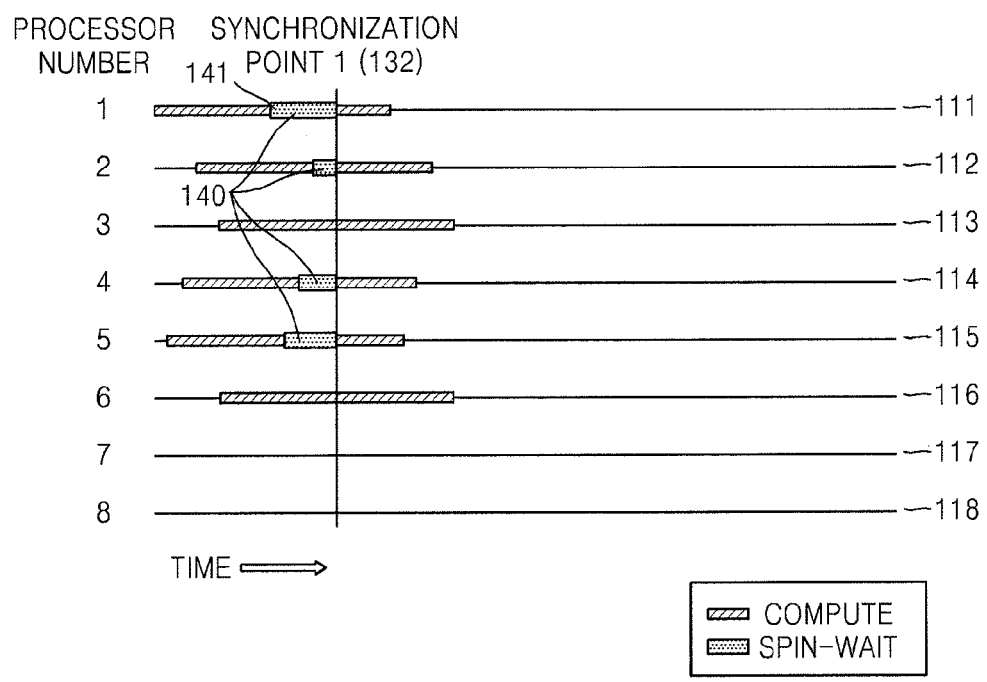
FIG. 1 illustrates an example of performing related tasks in a symmetric distributed system according to a related art technique.
Figure 2:
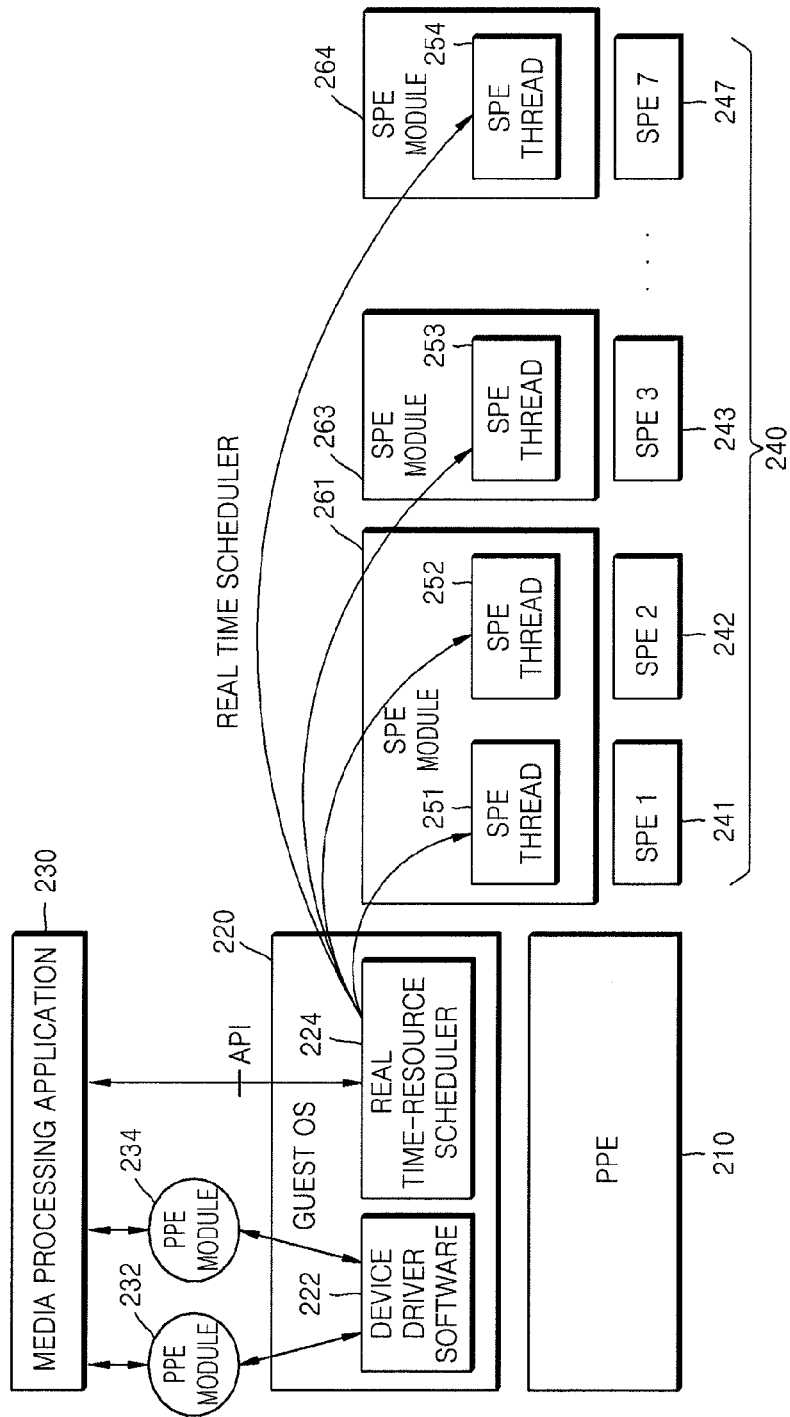
FIG. 2 illustrates an example of performing related tasks in an asymmetric multi-core processor according to a related art technique.
Figure 3:
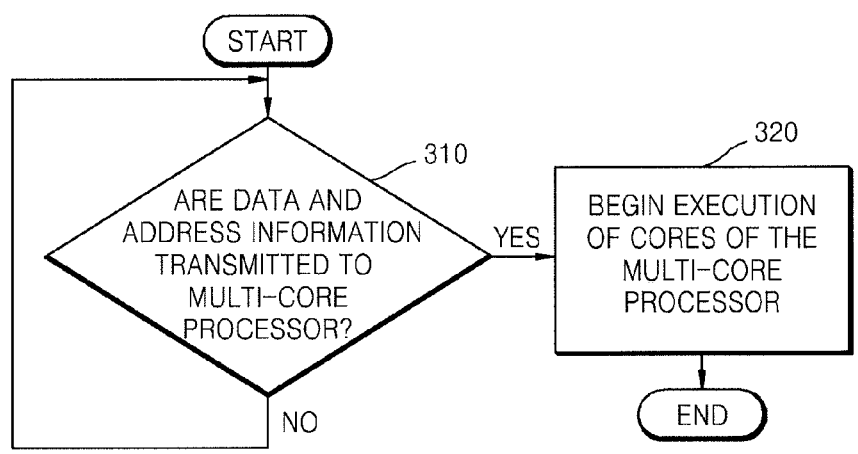
FIG. 3 is a flowchart of a method of performing related tasks according to an exemplary embodiment of the present invention.

FIG. 3 is a flowchart of a method of performing related tasks according to an exemplary embodiment of the present invention.

In operation 310, it is determined whether data and address information required for performing the related tasks are loaded by cores into a multi-core processor.

In this case, the address information may include an EA for indicating an indirect address of a storage space in the multi-core processor, and mapping information that indicates mapping information between the EA and a RA for indicating a real address of the storage space. When each core uses the mapping information, it is possible to transmit data and signals by only using the EA without using the RA of a storage space in another core.

Data and address information required to perform tasks, which are transmitted to the multi-core processor, may be loaded in at least one of a plurality of memories and registers in the multi-core processor.

In an exemplary embodiment of the present invention in which the related tasks are concurrently performed, a set of the related tasks is defined as a gang, and a scheduling for allowing the gang to be concurrently performed is defined as gang scheduling.

In operation 320, the multi-core processor is controlled so that the cores of the multi-core processor concurrently start to perform the tasks based on the determination result of operation 310.

As shown in FIG. 3, the method may further include controlling of the multi-core processor so that the mapping information cannot be changed in order to prevent the mapping information between the EA and the RA, which are loaded in the multi-core processor, from being changed, before the tasks are completed.

Figure 4:
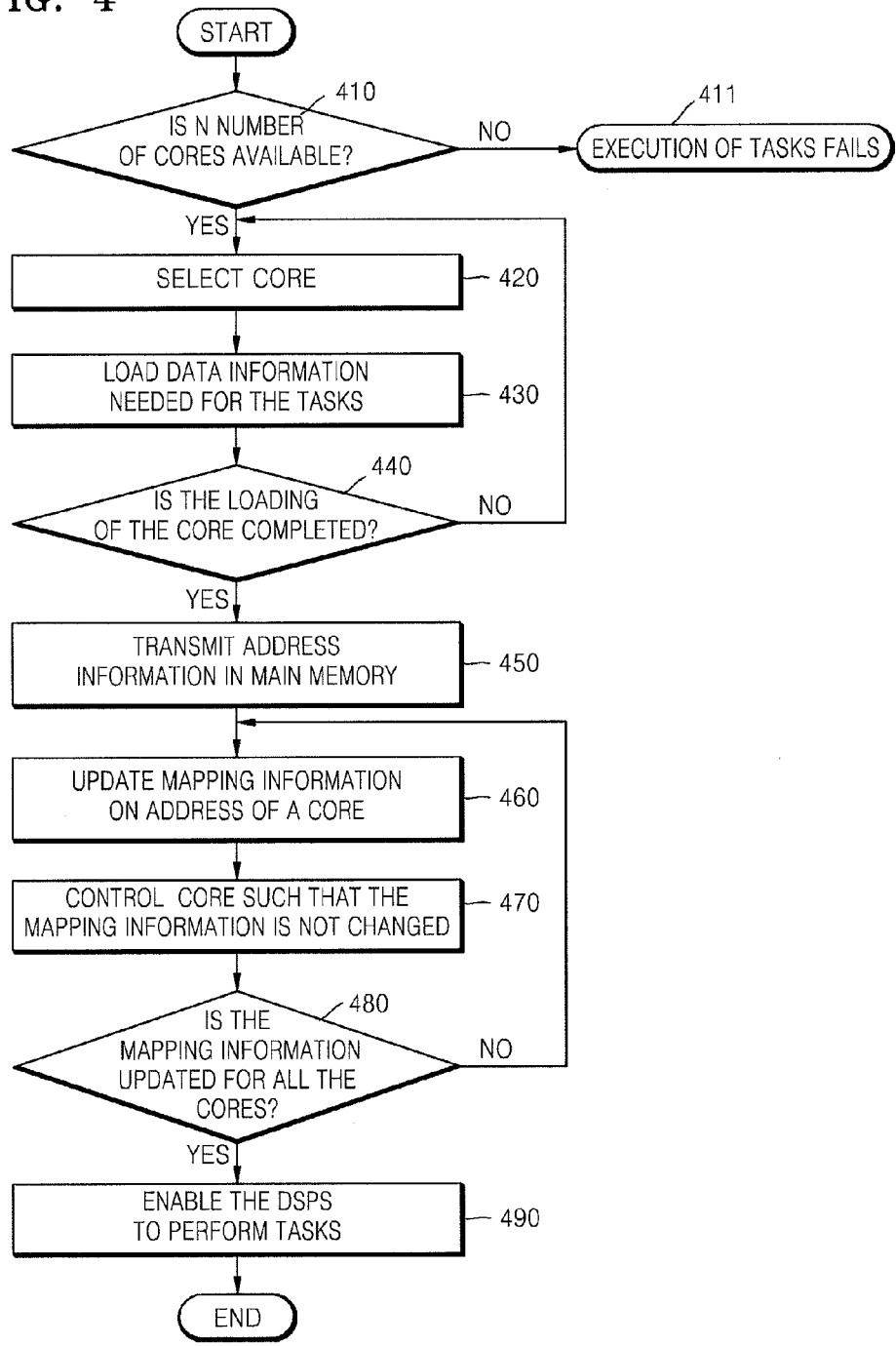
FIG. 4 is a detailed flowchart of the method of performing related tasks shown in FIG. 3.

FIG. 4 is a detailed flowchart of the method of performing related tasks according to an exemplary embodiment of the present invention shown in FIG. 3.

In operation 410, it is determined whether there are sufficient available cores necessary to perform the related tasks.

In operation 411, when it is determined that the number of the available cores is not sufficient to perform the related tasks in operation 410, the related tasks are not performed. Then, the next task will be checked by operation 410.

In operation 420, when it is determined that there are sufficient cores for performing the related tasks in operation 410, one of the available cores is selected. In this case, RAs of the memories and the registers included in the available cores may be separately stored.

In operation 430, data needed for performing the task is loaded in the memory and the register of the selected core.

In operation 440, it is determined whether the data needed for performing the task is loaded with respect to all the cores. When there are cores in which the data needed for performing the task is not loaded, data needed for performing the task is loaded with respect to all the cores by performing operations 420 and 430 with respect to the cores in which the data needed for performing the task is not loaded.

In operation 450, when it is determined that the data needed for performing the task is loaded for all the cores in operation 440, data including address mapping information in the main memory is updated. In a case where the address mapping information is updated when the data needed for performing the task is transmitted to all the cores, it is not necessary any more to access the main memory, even when a core needs data of another core while performing the task.

Although the data exists in a predetermined part in the main memory before the data is transmitted to the cores, the data is in memories and registers of the cores after the data is transmitted to the cores. The address mapping information is updated so that the EA for indicating a predetermined space in the main memory represents the memories and the registers of the cores.

In operation 460, the mapping information that is in the core is updated by transmitting only a part needed for performing the task, which is included in the mapping information that is updated in operation 450. The mapping information that is updated in operation 450 is stored in the main memory. In the cores, only the necessary mapping information is stored in predetermined registers. Accordingly, only the mapping information needed for performing the task is received from the main memory.

In operation 470, the multi-core processor is controlled so that the mapping information is not changed. When the corresponding mapping information is changed while the cores are performing the related tasks, since the cores receive wrong data or have to access the main memory, the multi-core processor is controlled so that the mapping information is not changed until the tasks of the cores are completed.

In operation 480, it is determined whether operations 460 and 470 are performed with respect to all the cores. When operations 460 and 470 are not performed with respect to all the cores, operations 460 and 470 are performed on the cores in which operations 460 and 470 are not performed.

In operation 490, when it is determined that address mapping information is updated for all the cores in operation 480, the task is performed by allowing the multi-core processor to operate.

Operations 420 to 460 and operation 480 correspond to operation 310 of FIG. 3.

In addition, operation 490 corresponds to operation 320 of FIG. 3.

Figure 5:
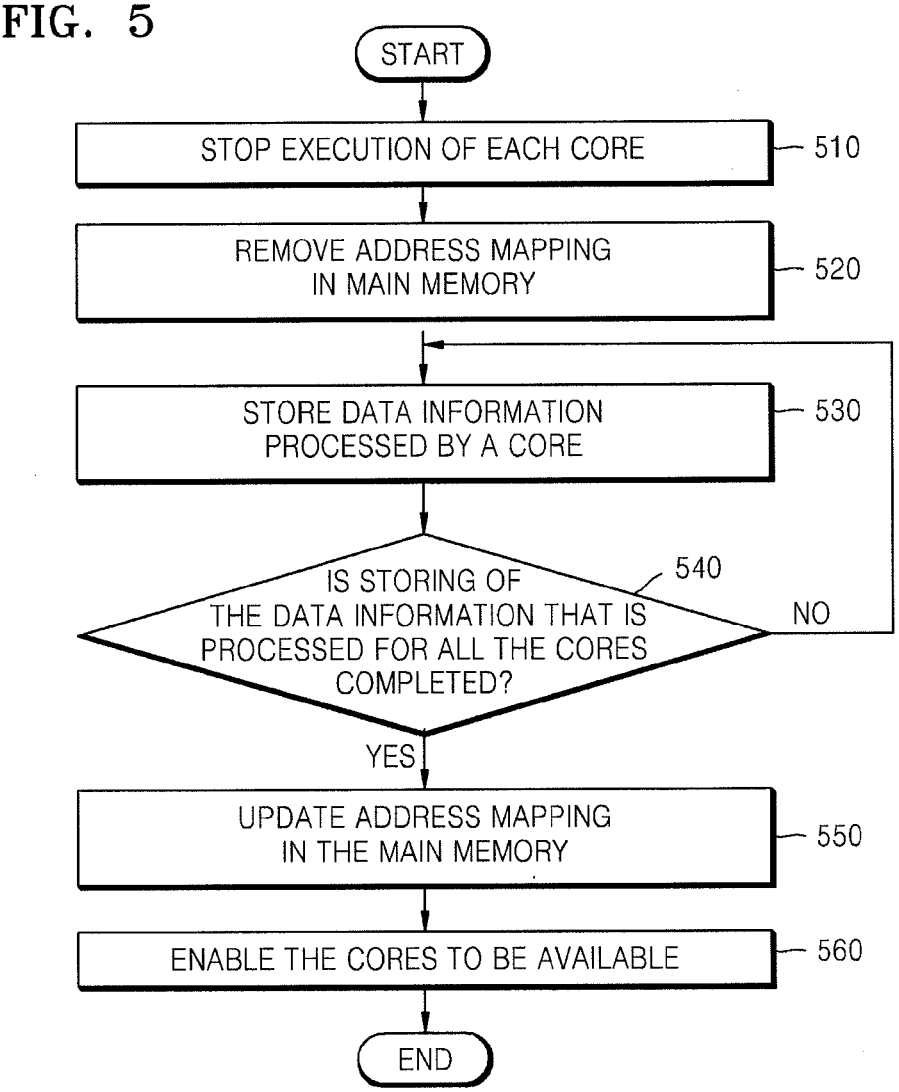
FIG. 5 is a flowchart of a method of terminating related tasks according to an exemplary embodiment of the present invention.

FIG. 5 is a flowchart of a method of terminating related tasks according to an exemplary embodiment of the present invention.

In operation 510, the performing of the related tasks in the cores is stopped.

In operation 520, the mapping information for the related tasks which is stored in the main memory is removed. A location, in which the data needed for performing the task is stored, is indicated by using an RA for representing a real storage space and an EA for representing an indirect address.

In operation 530, data regarding the execution of the task, which is stored in the local memory and the register of the core, is transmitted to the main memory.

In operation 540, operation 530 is performed for cores of which data is not transmitted to the main memory by determining whether the data regarding the execution of the task, which is stored in all the cores, is transmitted to the main memory.

In operation 550, the mapping information in the main memory is updated. Accordingly, address information for indicating the local memory in the core represents a predetermined location in the main memory. The address information regarding the predetermined location in the main memory in which the data transmitted from the memory and the register of the core is stored, is updated. As described above, this is performed by updating the mapping information between the EA for indicating the indirect address and the RA for indicating the direct address.

In operation 560, another task is allowed to be performed by controlling the multi-core processor so that the cores in which the performing of the tasks is completed, are used.

Figure 6:
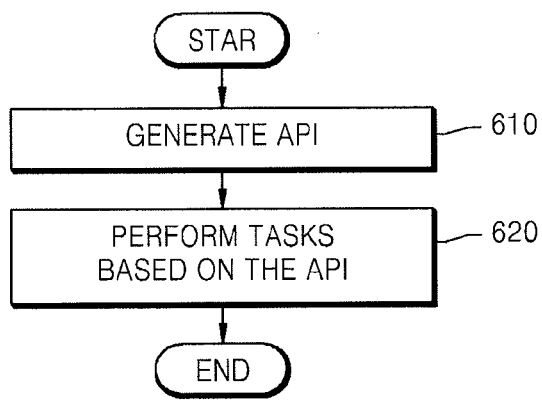
FIG. 6 is a flowchart of a method of performing tasks through an API according to an exemplary embodiment of the present invention.

FIG. 6 is a flowchart of a method of performing tasks through an API according to an exemplary embodiment of the present invention.

In operation 610, an API including information needed for performing related tasks is generated. The generated API may include the number of related tasks that are to be performed through the API, address information needed for performing the related tasks, and the like. The address information needed for performing the related tasks may be an EA for indicating an indirect address of a storage space of cores in which the related tasks are performed.

In operation 620, the related tasks are performed based on the API generated in operation 610. The cores that perform the related tasks can recognize the EA of the storage space in which the data needed for performing the tasks is stored by using the information included in the API that is generated in operation 610. The storage space may indicate the local memories and the registers included in the cores that perform the related tasks.

As described above, the cores can communicate data with one another by sharing the EAs of the local memories. In addition, the cores can directly communicate signals with one another by sharing the EAs of the registers.

Figure 7:
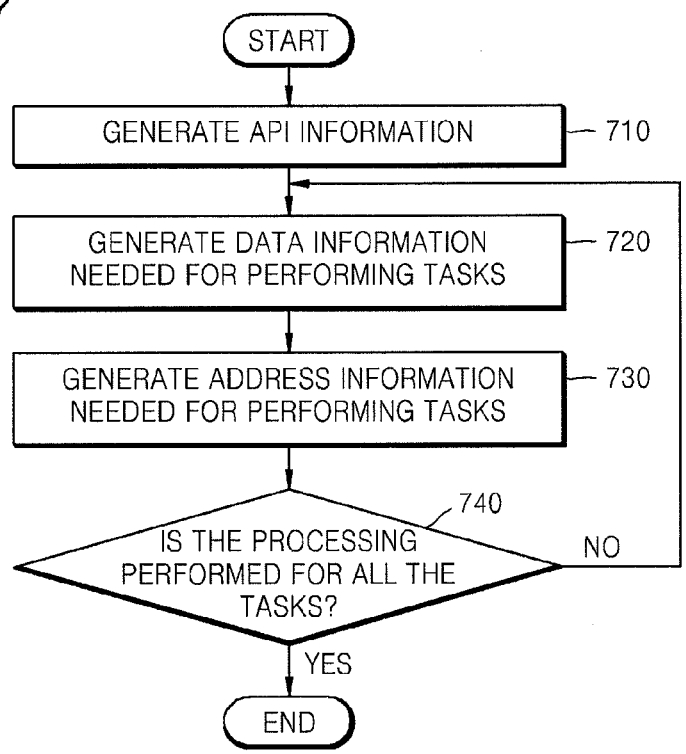
FIG. 7 is a flowchart of a method of generating an API needed for performing related tasks according to an exemplary embodiment of the present invention.

FIG. 7 is a flowchart of a method of generating an API needed for performing related tasks according to an exemplary embodiment of the present invention.

In operation 710, a structure for generating the API is generated. Information regarding the number of cores needed for performing the related tasks and the like may be stored in the structure.

In operation 720, mapping information between the EA of the data needed for performing tasks and the RA on the predetermined location in the main memory in which the corresponding data is stored, is generated.

In operation 730, the EA of the data needed for performing each task fills the structure generated in operation 710.

That is, when the structure is initially generated, the RA value corresponding to the EA indicates a location in which data is stored in the main memory. As shown in FIG. 4, when the data needed for performing the tasks is loaded in the cores, the RA corresponding to the EA indicates storage spaces (memories and registers) in the cores. This transformation is described with reference to FIGS. 4 and 5.

Figure 8:
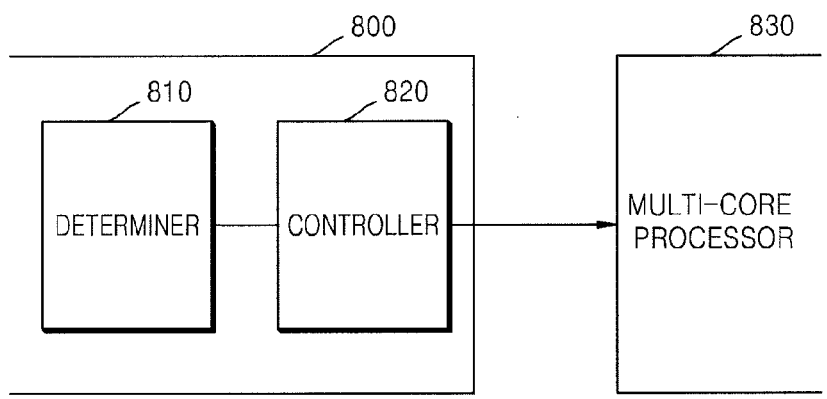
FIG. 8 is a block diagram of an apparatus for performing related tasks according to an exemplary embodiment of the present invention.

FIG. 8 is a block diagram of an apparatus 800 for performing related tasks according to an exemplary embodiment of the present invention.

The apparatus 800 for performing the related tasks includes a determiner 810 and a controller 820.

The determiner 810 determines whether data required for performing the related tasks and address information are loaded in the cores in a multi-core processor 830.

In this case, the address information may be an EA for indicating an indirect address of a storage space in the multi-core processor 830 and mapping information. The mapping information indicates mapping information between the EA and an RA for indicating a real address. It is possible to transmit data and signals by using only an EA without using an RA of another core by transmitting the EA to the multi-core processor 830.

Data and address information required for performing the tasks, which are transmitted to the multi-core processor 830, may be loaded in at least one of the memories and registers in the multi-core processor 830.

The controller 820 controls the multi-core processor 830 so that the cores of the multi-core processor 830 concurrently perform the tasks.

Figure 9:
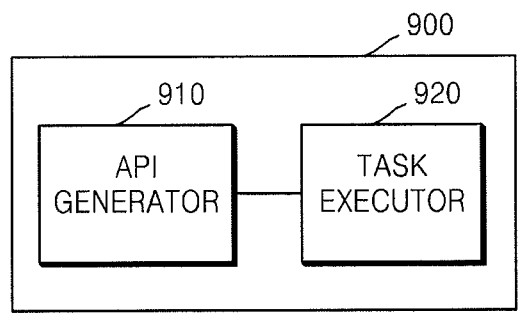
FIG. 9 is a block diagram of an apparatus for performing tasks related through an API according to an exemplary embodiment of the present invention.

FIG. 9 is a block diagram of an apparatus 900 for performing related tasks through an API according to an exemplary embodiment of the present invention.

The apparatus 900 for performing the related tasks includes an API generator 910 and a task executor 920.

The API generator 910 generates an API including information needed for performing the related tasks. The generated API may include the number of related tasks that are to be performed through the API, address information needed for performing the related tasks, and the like. The address information may be EAs for indicating indirect addresses of storage spaces of the cores in which the related tasks are performed.

The task executor 920 performs the related tasks based on the generated API.

It is possible to improve performance of a system by preventing a main memory from being unnecessarily accessed while performing the related tasks by synchronizing the related tasks so that the performance of related tasks are started concurrently.

In addition, it is possible to secure that necessary information is loaded in the cores, when tasks start to be performed, by synchronizing the related tasks so that the related tasks concurrently start to be performed. It is also possible to remove a page fault, when data is communicated among the cores, by synchronizing the related tasks so that the related tasks concurrently start to be performed.

It is possible to prevent errors due to a change in mapping information by controlling the multi-core processor so that the mapping information is not changed while related tasks are performed.

In addition, it is possible to easily transmit address information required for performing related tasks to the cores by performing the related tasks through an API.

Exemplary embodiments of the present invention can be written as computer programs and can be implemented in general-use digital computers that execute the programs using a computer readable recording medium or other transmission media.

Examples of the computer readable recording medium include magnetic storage media (e.g., ROM, floppy disks, hard disks, etc.) and optical recording media (e.g., CD-ROMs, or DVDs). Other transmission media can include carrier waves (e.g., transmission through the Internet).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing at least one related task on a multi-core processor including a plurality of cores, the method comprising:

determining whether a first data and a first address information of a first related task from among the set of the related tasks are loaded in the first core of the multi-core processor and whether a second data and a second address information of a second task from among the set of the related tasks are loaded in a second core of the multi-core processor; and controlling, only if it is determined that the first core is loaded with the first data and the first address information and at the same time the second core is loaded with the second data and the second address information, the multi-core processor so that the first core and the second core concurrently start to perform the first related task and the second related task respectively.

2. The method of claim 1, wherein the first address information and the second address information is mapping information between a first effect address (EA) and a second effect address (EA) for indicating a first indirect address and a second indirect address of a storage space in the multi-core processor and a first real address (RA) and a second real address (RA) for indicating a first real address and a second real address of the storage space which corresponds to the first EA and the second EA.

3. The method of claim 2, further comprising controlling the multi-core processor so that the mapping information is not changed while performing the set of related tasks.

4. The method of claim 1, wherein the first data and the first address information which are required to perform the first related tasks are loaded in at least one of a memory and a register of the first core of the multi-core processor.

5. An apparatus for performing a set of related tasks on a multi-core processor including a plurality of cores, the apparatus comprising:
 a processor;
 a determiner which determines whether a first data and a first address information of a first related task from among the set of the related tasks are loaded in first core of the multi-core processor and whether a second data and a second address information of a second related task from among the set of the related tasks from among the set of the related tasks are loaded in a second core of the multi-core processor; and
 a controller which controls, only if the determiner determines that the first core is loaded with the first data and the first address information and the second core is loaded with the second data and the second address information, the multi-core processor so that the first core and the second core concurrently start to perform the first related task and the second related task respectively.

6. The apparatus of claim 5, wherein the first and second address information is mapping information between a first effect address (EA) and a second effect address (EA) for indicating a first indirect address and a second indirect address of a storage space in the multi-core processor and a first real address (RA) and a second real address (RA) for indicating a first real address and a second real address of the storage space that corresponds to the first EA and the second EA.

7. The apparatus of claim 6, wherein the controller further controls the multi-core processor so that the mapping information is not changed while performing the set of related tasks.

8. The apparatus of claim 5, wherein the first data and the first address information which are required to perform the first at least one related task are loaded in at least one of a memory and a register of the first core of the multi-core processor.

9. A non-transitory computer-readable storage medium having stored thereon a method of performing a set of related tasks on a multi-core processor including a plurality of cores, the method comprising:
 determining whether a first data and a first address information of a first related task from among the set of the related tasks are loaded in the first core of the multi-core processor and whether a second data and a second address information of a second task from among the set of the related tasks are loaded in a second core of the multi-core processor; and
 controlling, only if it is determined that the first core is loaded with the first data and the first address information and the second core is loaded with the second data and the second address information, the multi-core processor so that the first core and the second core concurrently start to perform the first related task and the second related task respectively based.

* * * * *